March 11, 1924. 1,486,619
C. G. TOLSON
METHOD OF AND MEANS FOR INDICATING THE PROPER PERIOD FOR GEAR
CHANGING IN MOTOR VEHICLES
Filed June 5, 1923  3 Sheets-Sheet 1

INVENTOR:
Charles G. Tolson
By Wm Wallace White
ATTY

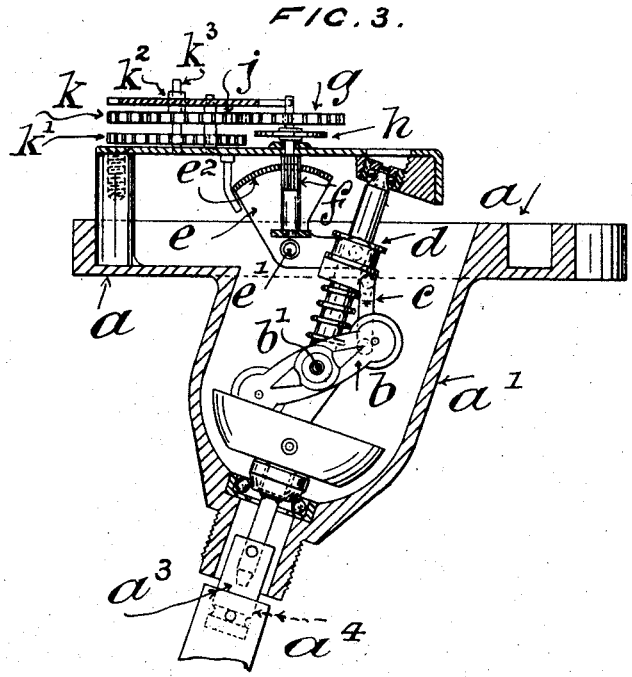
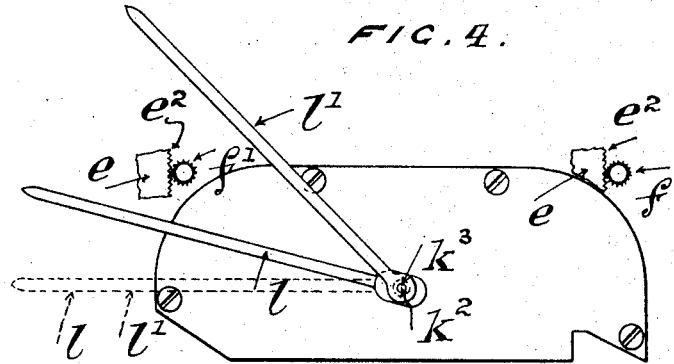

March 11, 1924.  1,486,619
C. G. TOLSON
METHOD OF AND MEANS FOR INDICATING THE PROPER PERIOD FOR GEAR
CHANGING IN MOTOR VEHICLES
Filed June 5, 1923   3 Sheets-Sheet 3
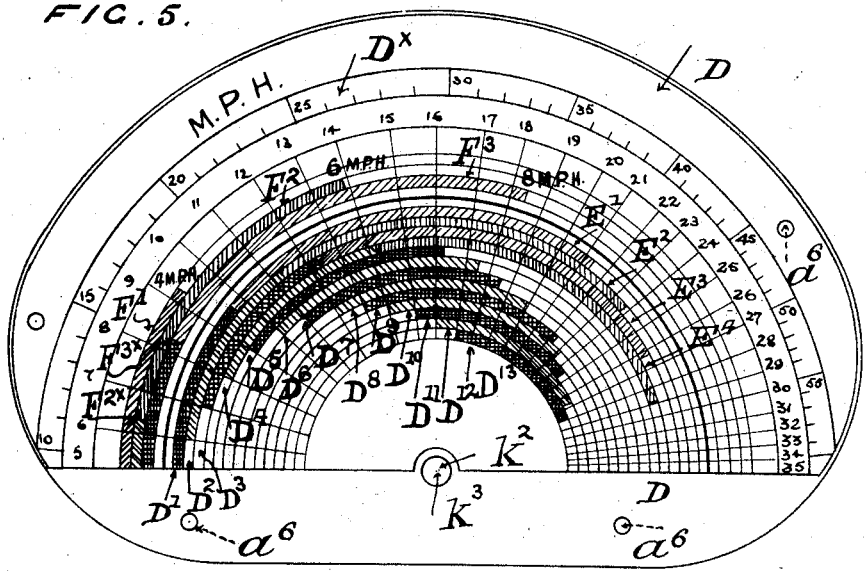
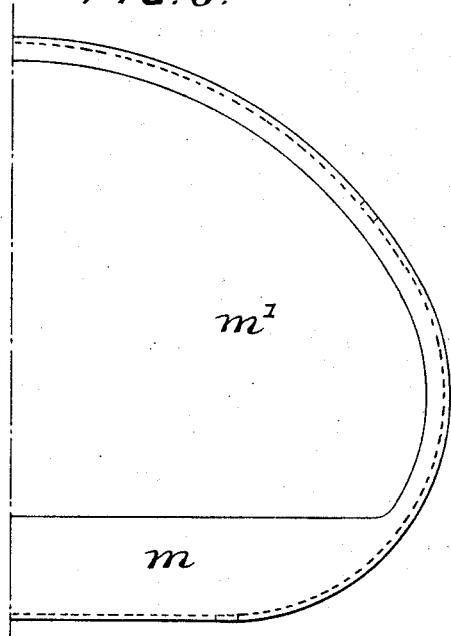
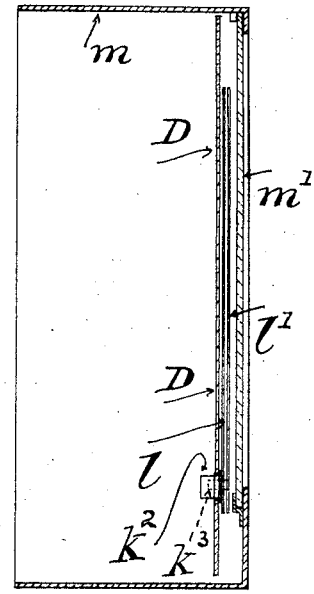
INVENTOR:
Charles G. Tolson
BY Wm Wallace White
ATTY.

Patented Mar. 11, 1924.

1,486,619

UNITED STATES PATENT OFFICE.

CHARLES GUTHRIE TOLSON, OF MANCHESTER, ENGLAND.

METHOD OF AND MEANS FOR INDICATING THE PROPER PERIOD FOR GEAR CHANGING IN MOTOR VEHICLES.

Application filed June 5, 1923. Serial No. 643,558.

*To all whom it may concern:*

Be it known that I, CHARLES GUTHRIE TOLSON, a subject of the King of Great Britain and Ireland, residing at Manchester, in the county of Lancaster, England, have invented new and useful Improvements in Methods of and Means for Indicating the Proper Period for Gear Changing in Motor Vehicles, of which the following is a specification.

This invention relates to a method of and means for indicating the proper period for the change from one gear to another in motor vehicles.

It is well known to drivers of motor vehicles that considerable difficulty is experienced in effecting a noiseless change of gear and that amateurs do not manage to change gear without making considerable noise, such bad changing in the long run damaging the gears and being at all times objectionable to sensitive ears.

Particularly is this the case with small high speed engines with three speed gear boxes where the power developed has relation to the speed of revolution of the engine.

It is also known that a practically silent change can be effected when the speed of revolution of the clutch shaft is running at a certain proportionate speed to the Cardan shaft such proportionate speed varying when changing down from top to second or second to bottom or upwards from bottom to second and so on. Such proportionate speeds can be calculated.

According to my method I propose to arrange for a reading or indication of the speed of revolution of the Cardan or other shaft conveying motion to the driving axle and of the clutch shaft or other shaft actuated by the engine (when the clutch is in) and I do this by providing mechanism of any suitable kind such as a revolution counter or speed indicating device, or a type of mechanism approximating to a speedometer. One of such devices is in driven connection with the Cardan or driven shaft and the other with the clutch or equivalent shaft. Such revolution counters or speed indicating devices are connected up through mechanism to dial pointers or indicators which work over a dial or chart suitably located, the dial pointers indicating thereon the speed of revolution of either shaft at any particular time and falling with the speed of said shafts when the clutch is thrown out.

The dial may be graduated radially or otherwise and marked out with strong or coloured segmental lines to indicate the range of speeds of the two shafts which will be shown by the relative positions the dial pointers occupy at any particular time, and the change of gear is made when the dial pointers or fingers are in proper relative position as shown upon the dial.

The attached drawings indicate means suitable for carrying out the method above set forth, and reference will be made thereto in the following detailed description.

In the drawings:—

Fig. 3 shows a section on the line X—X, Fig. 1, and indicates a construction of revolution counter which is not claimed by me, save in the sense that I use two combined instruments of this or similar type to actuate pointers moving over a dial for the purposes stated.

Fig. 4 is a separate plan view showing the independently movable pointers or fingers, their arbors, and the quadrants and pinions which impart motion to the train of gear and other details.

Fig. 5 is a separate plan view of a form of dial or indicator which is graduated and which has coloured or prominent segmental lines or arcs producing a type of graph capable of being instantly read or worked to, with the object of obviating the necessity to remember correct relative speeds for any particular change.

Fig. 6 is a half plan view of the enclosing glazed casing or cover.

Fig. 7 shows a sectional view of the glazed casing or cover together with the dial and pointers or fingers in position.

Figure 1:
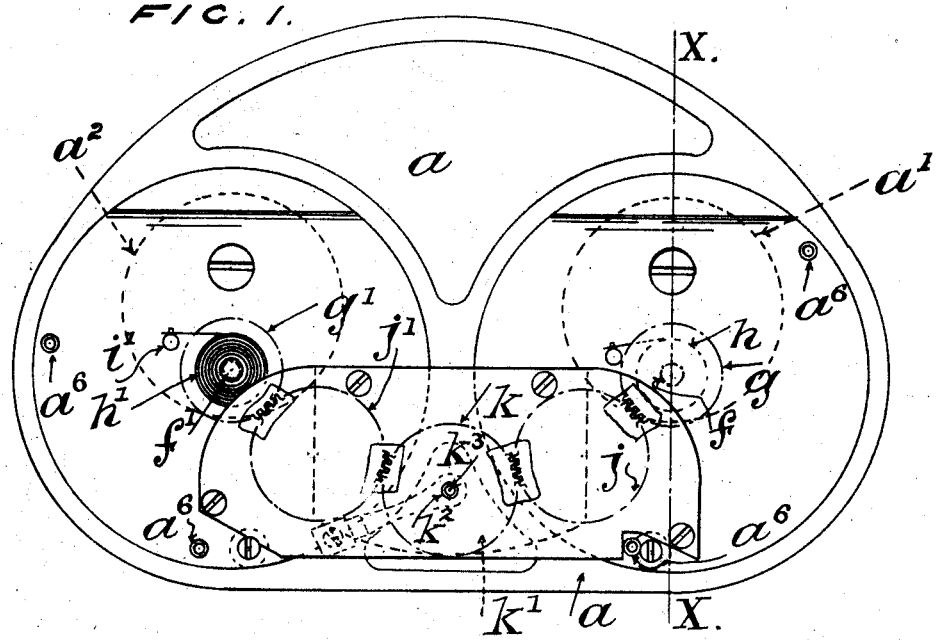
Fig. 1 is a plan view of one construction of indicator for carrying my invention into effect and wherein two revolution counters are combined in a casing, the graduated dial and cover being removed. In the figure only so much of the mechanism is shown as will suffice to explain my improvements.
Figure 2:
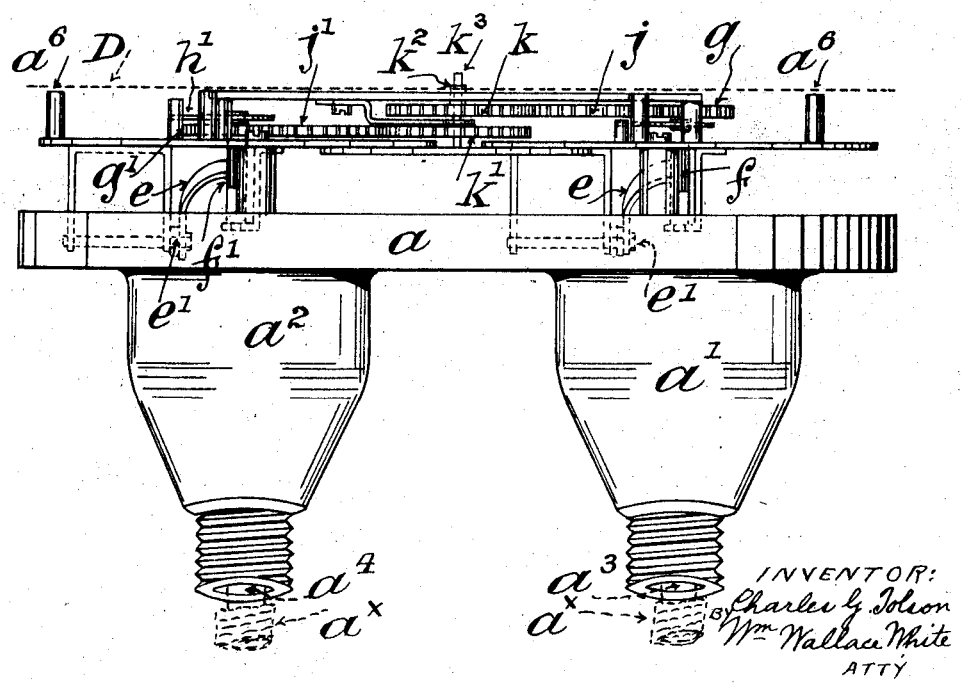
Fig. 2 is a side elevation of the indicator, showing the base of the supporting casing and the combined revolution counter housings, the pointer actuating gear, etc., the graduated dial and enclosing cover being removed.

Referring to the construction of indicator illustrated by the drawings, I therein show an aluminium or other base or body casting $a$ which is suitably shaped and machined and which has cast therewith or combines two housings $a'$ $a^2$ for encasing various parts of the revolution counter mechanism. This revolution counter mechanism has not been invented by me and may be of any suitable construction and needs no particular description. The tail-piece, of each counting mechanism actuating spindle, marked $a^3$ $a^4$ projects from its housing and is coupled-up by a flexible cable enclosed in a flexible casing $a^x$, $a^x$ in known fashion so as to be rotated from the shafts the revolutions of which are to be counted.

The flexible cable jointed to the tail-piece $a^3$ is driven from the clutch shaft or equivalent engine driven shaft of the vehicle. The tail piece $a^4$ is driven from the Cardan shaft. The counting mechanism is the same in both the housings of the revolution counters as will be understood. In each revolution counter there is a balanced load $b$ pivoted at $b'$ which balanced and pivoted load is (under revolution) influenced by centrifugal force, thus causing the link $c$ to act on the sliding sleeve or collar $d$. The sliding sleeve or collar $d$ acts on the engaging bowl of the quadrant marked $e$ pivoted at $e'$. The quadrant $e$ on the right-hand has teeth $e^2$ cut thereon which gear with a long toothed pinion $f$ which is compounded with a pinion $g$ movable against the action of a hair-spring $h$ connected thereto and anchored at $i$. Said pinion $g$ gears with a pinion or intermediate wheel $j$ which acts on the pinion $k$ upon the sleeve-like arbor $k^2$ on which a pointer $l$ is mounted and which pointer is coloured "black" for example and which is hereafter referred to as the clutch shaft pointer or finger.

The other quadrant for the revolution counter enclosed in the housing $a^2$ is marked $e$, is centred at $e'$ and has teeth $e^2$ which gear into a long toothed pinion $f'$ which is compounded with the pinion $g'$ movable against the action of the hair spring $h'$ connected thereto and anchored at $i'$. Said pinion $g'$ gears with a pinion or intermediate wheel $j'$ which acts on the pinion $k'$ upon the arbor $k^3$ on which a pointer $l'$ is mounted and which pointer is coloured "green" for example and is hereafter called the Cardan shaft pointer or finger. The arbor for the pointer $l'$ passes through the sleeve or like arbor for the pointer $l$.

Mounted upon the dial posts $a^6$ and fixed thereto (and below the dial pointers $l$ $l'$ on their arbors) is the dial marked D which is separately and clearly shown in Fig. 5. The dial D and the mechanism superposed over this body casting $a$ is enclosed by a correspondingly shaped removable cover $m$ having a glazed front $m'$ below which and over the dial, the pointers or fingers $l$ $l'$ move, as the Fig. 7 shows. The removable cover $m$ is fixed by screws and the complete indicator is applied to the dash-board of the vehicle and the flexible driving cables lead up to the back (for attachment at $a^x$, $a^x$) from driving mechanism on the clutch shaft and the Cardan shaft as will be understood. If there be no room on the clutch shaft, the pointer $l$ might be driven from the cam shaft through speed reducing mechanism.

The dial is marked as a whole D and may be graduated to indicate miles per hour around the outer segment $D^x$ as shown.

It is also graduated by radial lines with unit numbers 5 to 35 in the example illustrated to indicate the speed of revolution of the clutch and Cardan shafts in hundreds per minute. The graduation or marking is proportioned or set out so that the speed of revolution in hundreds per minute of the clutch and Cardan shafts can be indicated on the dial by the position of the "black" and "green" pointers $l$, $l'$, that is, if the green pointer $l'$ stands at 8 on the fourth inner graduated segment $D^4$ then the speed of revolution of the Cardan shaft is 800 per minute.

In like manner if the black pointer $l$ stands at 20 in the segmental line $D^8$ that pointer indicates that the clutch shaft is running at 2,000 revolutions per minute.

The graduations on the dial shown are set out and marked to suit an Enfield-Allday 10–20 H. P. car having a gear ratio of somewhere about 4.75 as a first gear, 7.9 as second gear, and 15.3 as a top gear. With such a gear ratio the relative speeds when a practically noiseless change can be made can be easily calculated, but by the use of radial lines and numbers only it would be necessary for the driver to memorize the relative speeds when a change could be quietly made.

In order to save a driver trouble of comparing relative speeds at any particular time, I provide the dial D with a type of graph or marking which relieves the driver of all difficulty. Such a graph of marking may be very varied. As an example strongly marked segmental lines of different colours in the nature of arcs such as $D^1$, $D^2$ up to $D^{13}$ and coloured black and green respectively may be used as indicated.

These are struck from the centre $k^2$, $k^3$ of the dial pointers or fingers $l$, $l'$, the arcs varying in length and being struck each from a varying radius so as to enable a dial of reasonable size to be used having thereon a considerable number of coloured segments. The range of coloured segments or arcs $D^1$ to $D^{13}$ in black and green are primarily for the purpose of indicating a change down from top gear to middle gear.

A further segmental marking is provided upon the dial in the form of continuation segmental lines or arcs marked $E^1$, $E^2$, $E^3$, $E^4$, and coloured alternately "purple" and "red" such arcs being conjoined with or continuations of the first four segments in "black" and "green" marked $D^1$ to $D^4$ and used in changing from the lowest to the middle gear. Such purple and red segmental lines or arcs are also used when changing down from middle to bottom gear or from top to bottom gear.

The said purple and red segmental arcs $E^1$ to $E^4$ are shown as extending from the graduation lines about 960 to 2,150 in respect of $E^1$, from about 1,130 to 2,350 in respect of $E^2$, from about 1,250 to 2,630 in respect of $E^3$ and 1,425 to 2,900 in respect of $E^4$.

To take an example of a change, let it be supposed the bottom gear has been engaged and the vehicle is under way with the Cardan shaft pointer standing on the green arc $D^2$ somewhere in the neighbourhood beyond the graduation line 600. It will be found that the clutch shaft pointer is standing somewhere on the red segment $E^2$ indicating a speed of something like 2,300 revolutions of the engine. To effect a noiseless change, to second speed, the clutch is disengaged and the engine speed allowed to sink to say about 1,130. When this occurs the Cardan shaft pointer will stand at 600 and the clutch shaft pointer at 1,130, that is, one pointer will be at one end of the segment or arc $D^2$ and the other pointer at the other extremity at which period precisely, a noiseless change can be effected. A similar quiet change can be effected into second gear with the pointers lying on the coloured segments $D'$ to $D^4$ and $E'$ to $E^4$, it being only necessary to wait until the two pointers indicate the extreme limits of any black or green segment or arc $D'$ to $D^4$ it being understood that the limits of the coloured segments or arcs $D'$ to $D^4$ coincide with the relative proper variations in speed for the Cardan shaft and the clutch shaft to permit a proper change.

To change upwards from the second gear to the top all that is requisite is that the pointers $l\ l'$ should lie one over the other or coincide when a noiseless change can be effected.

In changing down, the pointers $l\ l'$ work again with respect to the black and green segments $D'$ to $D^{13}$ and that prior to the change down the pointers coincide. To effect a noiseless change from top to middle gear the driver de-clutches and waits until the pointers are separated the distance between the two extremities of a black or green segment or arc $D'$ to $D^{13}$ when the change of gear is made.

When changing down from middle to bottom gear the purple and red segments $E'$ to $E^4$ again come into use, and on de-clutching, with the Cardan shaft pointer in the neighbourhood of the radial line denoting a speed of something over 800 per minute the speed of the clutch shaft must be raised to say 2,900, whereupon, with the Cardan shaft pointer $l'$ at 800 at the extreme end of segment $D^4$ and the clutch shaft pointer $l$ at 2,900 the extreme limit of the segment or arc $E^4$, a noiseless change to bottom can be made. By a similar disposition of the pointers arrived at, a change may be made from top to bottom gear direct if necessary for any purpose.

The reader will appreciate that the difference of speed between the Cardan shaft and the clutch shaft must be increased in ratio as the gear is lowered and decreased as the gear is changed higher the proper relative positions being indicated graphically by the coloured segments.

It is to be understood, the purpose of the coloured segments is to do away with the necessity of memorizing relative speeds, a driver knowing that when the pointers coincide with the extremities of any particular segment or segments the time is proper to effect a change except from second to top which is when the pointers are in the same position or overlying each other.

If a four speed gear box engine is in question the graduations on the dial would be such as to suit the proportions of the gears and the inclusion of the further gear and additional segmental lines or arcs in suitable fashion would be arranged on the dial.

The three additional segmental arcs marked $F'$, $F^2$, $F^3$, terminating on the indication 4 Miles per hour, 6 Miles per hour, and 8 Miles per hour, are intended to facilitate the noiseless engagement of the gears after "coasting" with the gear lever in neutral. At the end of coasting run, should the speed of the car be so slow that the indicator of the Cardan shaft be at zero, the driver has then to guess the speed of the car when he de-clutches, and if he estimates the speed at 4, 6 or 8 miles per hour, then if he wishes to go into the lowest gear he puts the car in gear when the clutch shaft pointer stands at the top extremity of the segmental arc $F'$, $F^2$, or $F^3$ according as he estimates the speed. As at such speeds the Cardan shaft pointer will probably be at zero, or not showing, same need not be considered. If the driver wishes to go into second gear estimating the car speed at 6 miles per hour then he engages the gear when the clutch shaft pointer sinks to the point $F^{2x}$ at the lower termination of the initial stretch of the segment F² and which may be differently coloured. If he wishes to go into second judging the speed of the car to be 8 miles per hour, he operates his gear lever when the clutch shaft pointer l indicates the point F³ˣ which marks the termination of the initial stretch of the segment F³ and which may be differently coloured.

The graduations are used for engaging the gears after coasting by quickening the clutch shaft in neutral to the top extremity of an arc consisting of the green and red together or of the black and purple together to engage the lowest gear by quickening the clutch shaft to the top extremity of either the black or the green arc to engage the second gear, or, whenever the two indicators coincide, to engage the top gear.

These graduations for engagement after coasting may be omitted altogether.

It is to be understood that the graduation or marking of the dial or the type of graph thereon indicated may be greatly varied, the one referred to being merely a very simple form to which I am in no way restricted.

In order to save time as to the period occupied in the clutch shaft speed sinking I may employ the usual known clutch stop arrangement or I may provide a small brake either hand or foot operated or even in connection with the gear lever and worked by a Bowden wire or other connections whereby the clutch shaft can be braked to more quickly reduce its speed.

It will be understod that the dial is in all cases so marked out and provided with segmental coloured arcs covering calculated relative speeds each arc or conjoined arcs (for changing up or down) starting at an indicated speed correct for the Cardan shaft pointer and finishing at an indicated proper speed correct for the clutch shaft pointer whereby when the pointers are separated the length of the arc or arcs the time is proper for the change of gear. The change upwards into the top is when both pointers coincide as already mentioned.

Substantial arrow tips or other marks may extend from the segments to allow of a change when the dial pointers coincide with the proper arrow tips with a view to diminishing any undue wait before making a change.

I have broadly indicated my method and means as far as I am aware the method indicated is new and represents a development of considerable novelty. I have not dealt with a dial for four speed gear box, but it will be understood the graduating, marking and provision of coloured arcs of a dial for such would be only an extension of the system set out herein. I may combine a "distance travelled" recording mechanism with "trip" device for separate journeys along with my apparatus.

I declare that what I claim is:

1. The method of indicating the proper period for gear changing up or down in motor vehicles according to which revolution counters or speed indicators are used combined within or with an instrument and arranged to work two pointers or fingers moving over a dial which is graduated and marked by segments or arcs of different colour in manner to permit a change at sight when the pointers are in proper relative positions on and indicated at sight on the dial.

2. Means for indicating the movement in time for effecting a change of gear for motor vehicles wherein is employed revolution counters, speedometer mechanism, or like instruments, enclosed in a casing and which through combined gear actuate pointers or hands moving over an enclosed dial the latter being graduated and marked by coloured segments whereby when the pointers occupy certain relative positions according to the marking a change of gear can be made noiselessly.

3. Means for ensuring a noiseless gear change in connection with motor vehicles consisting of a casing with which are combined revolution counters adapted to be driven and which counters operate combined gear and enclosed pointers or hands moving over a dial upon which the pointers work and whereon positions for ensuring a noiseless change are graphically indicated by coloured segments or arcs or equivalent markings whereby the driver is relieved of the necessity of remembering or having to consider relative speeds as herein set forth.

4. Means for indicating the movement in time for effecting gear changing for motor vehicles consisting of a casing with which are encased and combined revolution counters or speed indicating devices adapted to be driven by flexible connections from the shafts and actuating combined and enclosed gear trains to operate two pointers the latter enclosed and movable over a dial upon which are set out segments or arcs of varying lengths and differently coloured and struck from a varying radius with the object of graphically indicating with the aid of said pointers when a change of gear can be quietly made.

5. Means for the indicated purpose comprising a casing, revolution counters located therein, quadrants in the revolution counters, means to influence said quadrants, gear wheels influenced by the quadrants, arbors actuated by the gear wheels, pointers on the arbors and a graduated dial, and segmental markings on the dial, and enclosing devices for the dial and pointers.

6. Means for the indicated purpose consisting of a casing, revolution counters in said casing, movable devices in the revolution counters, quadrants in the revolution counters acted upon by the movable devices, teeth on the quadrants and pinions acted upon by the quadrants, and gear wheels influenced by the pinions to actuate arbors and differently coloured pointers mounted on the arbors and a dial with segments in different colours the pointers and the dial being enclosed in the casing as related.

In testimony whereof I have signed my name to this specification.

CHARLES GUTHRIE TOLSON.